(12) United States Patent
Xie

(10) Patent No.: US 10,384,950 B1
(45) Date of Patent: Aug. 20, 2019

(54) SYNTHESIS OF MOLECULAR SIEVE SSZ-35

(71) Applicant: Chevron U.S.A. Inc., San Ramon, CA (US)

(72) Inventor: Dan Xie, Richmond, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 14 days.

(21) Appl. No.: 15/956,963

(22) Filed: Apr. 19, 2018

(51) Int. Cl.
*C01B 39/48* (2006.01)
*B01J 29/70* (2006.01)

(52) U.S. Cl.
CPC ............ *C01B 39/48* (2013.01); *B01J 29/70* (2013.01); *C01P 2002/74* (2013.01)

(58) Field of Classification Search
CPC ........ C01B 39/48; C01P 2002/74; B01J 29/70
See application file for complete search history.

(56) References Cited

U.S. PATENT DOCUMENTS

| | | | |
|---|---|---|---|
| 5,316,753 A | 5/1994 | Nakagawa |
| 5,391,287 A | 2/1995 | Nakagawa |
| 8,999,288 B1 | 4/2015 | Elomari |
| 9,206,052 B2 | 12/2015 | Elomari |

FOREIGN PATENT DOCUMENTS

JP    2002137918    5/2002

OTHER PUBLICATIONS

Paillaud et al, "Sytnhesis and characterization of as-synthesized Mu-26, a zeolitic material with the STF framework topology", Microporous and Mesoporous Materials, vol. 105, pp. 89-100 (Sep. 2007) (Year: 2007).*

L.A. Villaescusa, P.A. Barrett and M.A. Camblor "Synthesis of ITQ-9; a new microporous SiO2 polymorph" Chem. Commun. 1998, 2329-2330.

P. Wagner, S.I. Zones, M.E. Davis and R.C. Medrud "SSZ-35 and SSZ-44: Two Related Zeolites containing Pores Circumscribed by Ten- and Eighteen-Membered Rings" Angew. Chem. Int. Ed. 1999, 38, 1269-1272.

P. Wagner, Y. Nakagawa, G.S. Lee, M.E. Davis, S. Elomari, R.C. Medrud and S.I. Zones "Guest/Host Relationships in the Synthesis of the Novel Cage-Based Zeolites SSZ-35, SSZ-36, and SSZ-39" J. Am. Chem. Soc. 2000, 122, 263-273.

B. Harbuzaru, M. Roux, J-L. Paillaud, F. Porcher, C. Marichal, J-M. Chezeau and J. Patarin "Synthesis and Characterisation of Mu-26 a Fluorinated All-Silica Zeolite with the STF Framework Topology: Evidence for a Triclinic Symmetry" Chem. Lett. 2002, 616-617.

C.A. Fyfe, D.H. Brouwer, A.R. Lewis, L.A. Villaescusa and R.E. Morris "Combined Solid State NMR and X-ray Diffraction Investigation of the Local Structure of the Five-Coordinate Silicon in Fluoride-Containing As-Synthesized STF Zeolite" J. Am. Chem. Soc. 2002, 124, 7770-7778.

* cited by examiner

*Primary Examiner* — David M Brunsman
(74) *Attorney, Agent, or Firm* — Terrence M. Flaherty

(57) ABSTRACT

A molecular sieve having the framework structure of SSZ-35 is produced using 3,3'-(butane-1,4-diyl)bis(1-methyl-2-propyl-1H-imidazol-3-ium) dications as a structure directing agent.

10 Claims, 4 Drawing Sheets

SYNTHESIS OF MOLECULAR SIEVE SSZ-35

TECHNICAL FIELD

This disclosure relates to the synthesis of crystalline molecular sieves having the framework structure of SSZ-35.

BACKGROUND

Molecular sieve materials, both natural and synthetic, have been demonstrated in the past to be useful as adsorbents and to have catalytic properties for various types of hydrocarbon conversion reactions. Certain molecular sieves, such as zeolites, aluminophosphates, and mesoporous materials, are ordered, porous crystalline materials having a definite crystalline structure as determined by X-ray diffraction (XRD). Within the crystalline molecular sieve material there are a large number of cavities which may be interconnected by a number of channels or pores. These cavities and pores are uniform in size within a specific molecular sieve material. Because the dimensions of these pores are such as to accept for adsorption molecules of certain dimensions while rejecting those of larger dimensions, these materials have come to be known as "molecular sieves" and are utilized in a variety of industrial processes.

Molecular sieves are classified by the Structure Commission of the International Zeolite Association according to the rules of the IUPAC Commission on Zeolite Nomenclature. According to this classification, framework type zeolites and other crystalline microporous molecular sieves, for which a structure has been established, are assigned a three-letter code and are described in the *Atlas of Zeolite Framework Types*, Sixth Revised Edition, Elsevier (2007). SSZ-35 is one of the molecular sieves for which a structure has been established and materials of this framework type are designated as STF.

STF framework type molecular sieves possess a one-dimensional channel system with pore openings that alternate between rings containing 10 tetrahedral atoms (T-atoms) and 18 tetrahedral atoms.

The composition and characterizing X-ray diffraction pattern of molecular sieve SSZ-35 are disclosed in U.S. Pat. No. 5,316,753, which also describes the preparation of the molecular sieve using conformationally constrained azapolycyclic ring system templating agents.

Japanese Patent Publication No. 2002-137918 discloses the synthesis of SSZ-35 using cis, cis, cis-N-methyl hexahydrojulolidinium cations as a structure directing agent.

U.S. Pat. No. 8,999,288 discloses the synthesis of SSZ-35 using N,N-dimethylazonanium cations as a structure directing agent.

U.S. Pat. No. 9,206,052 discloses the synthesis of SSZ-35 using N,N-diethyl-2,3-dimethylpiperidinium cations or N,N-dimethyl-2-isopropylpiperidinium cations as a structure directing agent.

According to the present disclosure, it has now been found the cations described herein are effective as structure directing agents in the synthesis of SSZ-35.

SUMMARY

In one aspect, there is provided a method of synthesizing a molecular sieve having the structure of SSZ-35, the method comprising: (a) providing a reaction mixture comprising: (1) a source of silicon oxide; (2) a source of boron oxide; (3) optionally, a source of a Group 1 or Group 2 metal (M); (4) a structure directing agent (Q) comprising 3,3'-(butane-1,4-diyl)bis(1-methyl-2-propyl-1H-imidazol-3-ium) dications; (5) a source of hydroxide ions; and (6) water; and (b) subjecting the reaction mixture to crystallization conditions sufficient to form crystals of the molecular sieve.

In another aspect, there is provided a molecular sieve having the structure of SSZ-35 and, in its as-synthesized form, comprising 3,3'-(butane-1,4-diyl)bis(1-methyl-2-propyl-1H-imidazol-3-ium) dications in its pores.

DETAILED DESCRIPTION

Introduction

Figure 1:
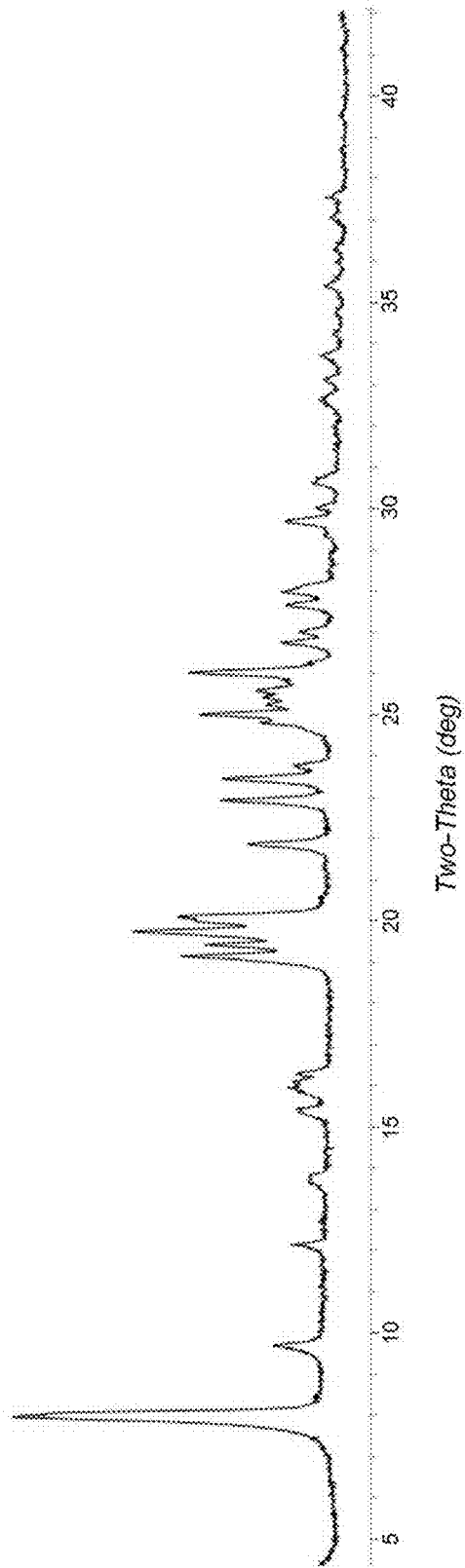
FIG. 1 shows a powder X-ray diffraction (XRD) pattern of the as-synthesized molecular sieve prepared in Example 1.

The term "as-synthesized" is employed herein to refer to a molecular sieve in its form after crystallization, prior to removal of the structure directing agent.

The term "anhydrous" is employed herein to refer to a molecular sieve substantially devoid of both physically adsorbed and chemically adsorbed water.

As used herein, the numbering scheme for the Periodic Table Groups is as disclosed in *Chem. Eng. News* 1985, 63(5), 26-27.

Reaction Mixture

In general, a molecular sieve having the framework structure of SSZ-35 may be synthesized by: (a) providing a reaction mixture comprising: (1) a source of silicon oxide; (2) a source of boron oxide; (3) optionally, a source of a Group 1 or Group 2 metal (M); (4) a structure directing agent (Q) comprising 3,3'-(butane-1,4-diyl)bis(1-methyl-2-propyl-1H-imidazol-3-ium) dications; (5) a source of hydroxide ions; and (6) water; and (b) subjecting the reaction mixture to crystallization conditions sufficient to form crystals of the molecular sieve.

The composition of the reaction mixture from which the molecular sieve is formed, in terms of molar ratios, is identified in Table 1 below:

TABLE 1

| Reactants | Useful | Exemplary |
|---|---|---|
| $SiO_2/B_2O_3$ | ≥2 | 10 to 50 |
| $M/SiO_2$ | 0 to 0.50 | 0 to 0.10 |
| $Q/SiO_2$ | 0.05 to 0.50 | 0.10 to 0.30 |
| $OH/SiO_2$ | 0.15 to 0.50 | 0.15 to 0.40 |
| $H_2O/SiO_2$ | 10 to 80 | 15 to 50 | wherein M is a Group 1 or Group 2 metal and Q comprises 3,3'-(butane-1,4-diyl)bis(1-methyl-2-propyl-1H-imidazol-3-ium) dications.

Suitable sources of silicon oxide include fumed silica, colloidal silica, precipitated silica, alkali metal silicates and tetraalkyl orthosilicates.

Suitable sources of boron oxide include boric acid, sodium tetraborate and potassium tetraborate.

Examples of suitable Group 1 or Group 2 metals (M) include sodium, potassium, and calcium. The metal is generally present in the reaction as the hydroxide.

The structure directing agent (Q) comprises 3,3'-(butane-1,4-diyl)bis(1-methyl-2-propyl-1H-imidazol-3-ium) dications, represented by the following structure (1):

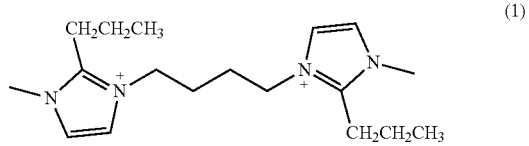

(1)

Suitable sources of Q are the hydroxides and/or other salts of the diquaternary ammonium compound.

The reaction mixture may also contain seeds of a crystalline material, such as SSZ-35 from a previous synthesis, desirably in an amount of from 0.01 to 15,000 ppm by weight (e.g., from 100 to 10,000 ppm by weight) of the reaction mixture. Seeding can be advantageous in decreasing the amount of time necessary for complete crystallization to occur. In addition, seeding can lead to an increased purity of the product obtained by promoting the nucleation and/or formation of SSZ-35 over any undesired phases.

For each embodiment described herein, the molecular sieve reaction mixture can be supplied by more than one source. Also, two or more reaction components can be provided by one source.

The reaction mixture can be prepared either batch wise or continuously. Crystal size, morphology and crystallization time of the molecular sieve described herein can vary with the nature of the reaction mixture and the crystallization conditions.

Crystallization and Post-Synthesis Treatment

Crystallization of the molecular sieve from the above reaction mixture can be carried out under either static, tumbled or stirred conditions in a suitable reactor vessel, such as for example polypropylene jars or Teflon-lined or stainless-steel autoclaves, at a temperature of from 125° C. to 200° C. for a time sufficient for crystallization to occur at the temperature used, e.g., from about 3 to 21 days. Crystallization is usually carried out in a closed system under autogenous pressure.

Once the molecular sieve crystals have formed, the solid product is separated from the reaction mixture by standard mechanical separation techniques such as centrifugation or filtration. The crystals are water-washed and then dried to obtain the as-synthesized molecular sieve crystals. The drying step is typically performed at a temperature of less than 200° C.

As a result of the crystallization process, the recovered crystalline molecular sieve product contains within its pores at least a portion of the structure directing agent used in the synthesis.

The molecular sieve described herein may be subjected to treatment to remove part or all of the structure directing agent used in its synthesis. This is conveniently effected by thermal treatment in which the as-synthesized material is heated at a temperature of at least about 370° C. for at least 1 minute and generally not longer than 20 hours. The thermal treatment can be performed at a temperature up to 925° C. While sub-atmospheric pressure can be employed for the thermal treatment, atmospheric pressure is desired for reasons of convenience. Additionally or alternatively, the structure directing agent can be removed by treatment with ozone (see, e.g., A. N. Parikh et al., *Micropor. Mesopor. Mater.* 2004, 76, 17-22).

Aluminum-containing forms of SSZ-35 may be prepared from borosilicate SSZ-35 by suitable treatment of borosilicate SSZ-35 with an aluminum salt (e.g., aluminum nitrate). Such heteroatom lattice substitution techniques are described, for example, in U.S. Pat. Nos. 6,468,501 and 6,790,433. The proportion of boron in the borosilicate framework of SSZ-35 that may be replaced with aluminum may be in a range of from greater than 0% to 100%, (e.g., from 75% to 100%, or from 85% to 100%). In some aspects, at least 50% of the boron in the borosilicate framework is replaced with aluminum.

To the extent desired, any Group 1 or 2 metal cations in the as-synthesized molecular sieve can be replaced in accordance with techniques well known in the art by ion exchange with other cations. Preferred replacing cations include metal ions (e.g., rare earth metals and metals of Groups 2 to 15 of the Periodic Table), hydrogen ions, hydrogen precursor ions (e.g., ammonium ions), and combinations thereof.

SSZ-35 can be formulated into a catalyst composition by combination with other materials, such as binders and/or matrix materials, which provide additional hardness or catalytic activity to the finished catalyst. When blended with such components, the relative proportions of SSZ-35 and matrix may vary widely with the SSZ-35 content ranging from 1 to 90 wt. % (e.g., from 2 to 80 wt. %) of the total catalyst.

Characterization of the Molecular Sieve

In its as-synthesized and anhydrous form, the present molecular sieve has a chemical composition comprising the following molar relationship described in Table 2:

TABLE 2

|  | Broad | Exemplary |
|---|---|---|
| $SiO_2/B_2O_3$ | ≥2 | 10 to 50 |
| $Q/SiO_2$ | >0 to 0.1 | >0 to 0.1 |
| $M/SiO_2$ | 0 to 0.1 | 0 to 0.1 | wherein Q comprises 3,3'-(butane-1,4-diyl)bis(1-methyl-2-propyl-1H-imidazol-3-ium) dications and M is a Group 1 or Group 2 metal.

It should be noted that the as-synthesized form of the present molecular sieve may have molar ratios different from the molar ratios of reactants of the reaction mixture used to prepare the as-synthesized form. This result may occur due to incomplete incorporation of 100% of the reactants of the reaction mixture into the crystals formed (from the reaction mixture).

As taught by U.S. Pat. No. 5,316,753, molecular sieve SSZ-35 has an X-ray diffraction pattern which, in its as-synthesized form, includes at least the peaks set forth in Table 3 below and which, in its calcined form, includes at least the peaks set forth in Table 4.

TABLE 3

Characteristic Peaks for As-Synthesized SSZ-35

| 2-Theta | d-spacing, nm | Relative Intensity[a] |
|---|---|---|
| 7.96 | 1.1091 | VS |
| 9.56 | 0.9241 | W |
| 15.37 | 0.5759 | M |
| 18.76 | 0.4726 | W |

TABLE 3-continued

Characteristic Peaks for As-Synthesized SSZ-35

| 2-Theta | d-spacing, nm | Relative Intensity[a] |
|---|---|---|
| 19.02 | 0.4662 | M |
| 19.24 | 0.4609 | VS |
| 19.87 | 0.4464 | M |
| 21.57 | 0.4116 | W |
| 22.78 | 0.3900 | M |
| 24.95 | 0.3566 | M |
| 27.33 | 0.3260 | M |
| 29.09 | 0.3067 | W |

[a] The powder XRD patterns provided are based on a relative intensity scale in which the strongest line in the XRD pattern is assigned a value of 100: W = weak (>0 to ≤20); M = medium (>20 to ≤40); S = strong (>40 to ≤60); VS = very strong (>60 to ≤100).

TABLE 4

Characteristic Peaks for Calcined SSZ-35

| 2-Theta | d-spacing, nm | Relative Intensity[a] |
|---|---|---|
| 8.00 | 1.1042 | VS |
| 9.67 | 0.9143 | W |
| 15.42 | 0.5743 | W |
| 19.01 | 0.4665 | W |
| 19.44 | 0.4562 | W |
| 19.48 | 0.4552 | W |
| 19.92 | 0.4454 | W |
| 21.70 | 0.4092 | W |
| 22.84 | 0.3891 | W |
| 24.81 | 0.3586 | W |
| 27.50 | 0.3240 | W |
| 29.41 | 0.3035 | W |

[a] The powder XRD patterns provided are based on a relative intensity scale in which the strongest line in the XRD pattern is assigned a value of 100: W = weak (>0 to ≤20); M = medium (>20 to ≤40); S = strong (>40 to ≤60); VS = very strong (>60 to ≤100).

The powder X-ray diffraction patterns presented herein were collected by standard techniques. The radiation was CuKα radiation. The peak heights and the positions, as a function of 2θ where θ is the Bragg angle, were read from the relative intensities of the peaks (adjusting for background), and d, the interplanar spacing corresponding to the recorded lines, can be calculated.

Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

EXAMPLES

The following illustrative examples are intended to be non-limiting.

Example 1

Synthesis of SSZ-35

2.77 g of deionized water, 4.98 g of a 10.19% 3,3'-(butane-1,4-diyl)bis(1-methyl-2-propyl-1H-imidazol-3-ium) hydroxide solution, 0.19 g of boric acid powder, 3.00 g of LUDOX© AS-30 colloidal silica (30 wt. % suspension in water), and 0.16 g of a 32-35% HCl solution were mixed together in a Teflon liner. The resulting gel was stirred until it became homogeneous. The liner was then capped and sealed within a Parr steel autoclave reactor. The autoclave was then placed an oven and heated at 160° C. for 11 days with tumbling (43 rpm). The solid products were recovered from the cooled reactor by centrifugation, washed with deionized water and dried at 95° C.

Figure 2:
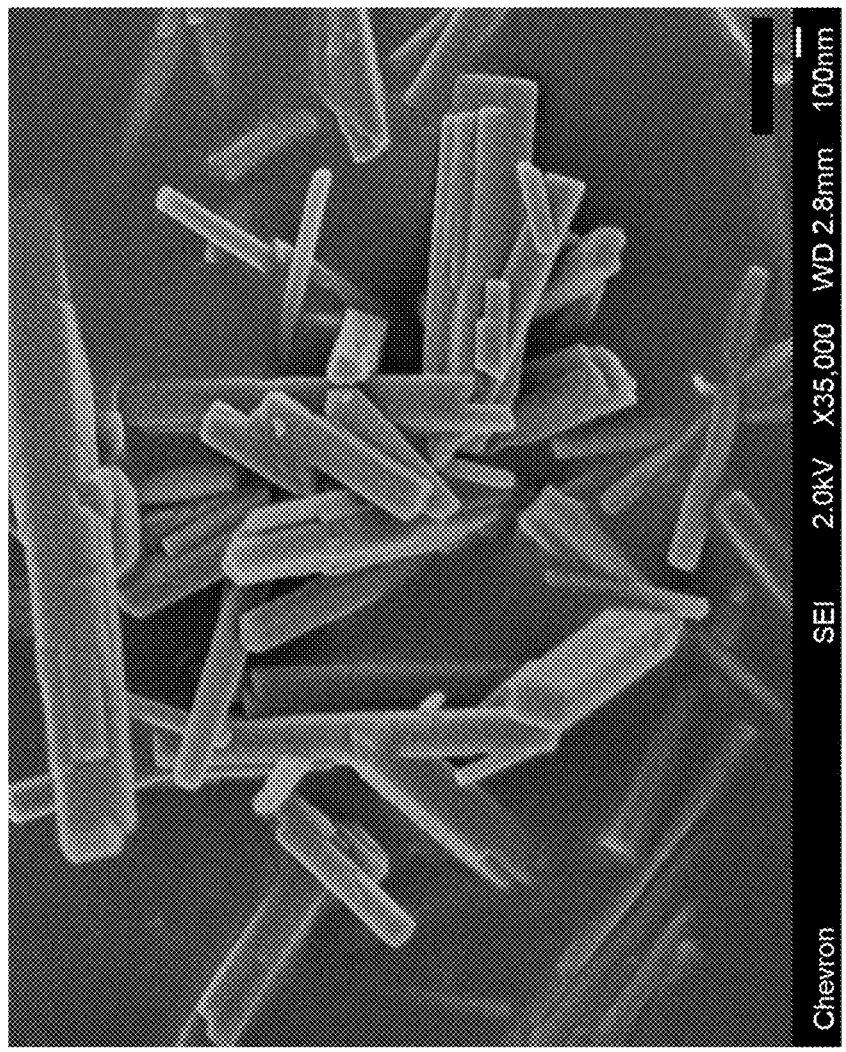
FIG. 2 shows a Scanning Electron Micrograph (SEM) image of the as-synthesized molecular sieve prepared in Example 1.

The resulting product was analyzed by powder XRD and SEM. The powder XRD pattern of the product is shown FIG. 1 and is consistent with the product being SSZ-35. A SEM image of the product is shown in FIG. 2 and indicates a uniform field of crystals.

The product had a $SiO_2/B_2O_3$ molar ratio of 11.3, as determined by ICP elemental analysis.

Example 2

Seeded Synthesis of SSZ-35

Example 1 was repeated with the exception that 10 wt. % seed crystals of borosilicate SSZ-35 from a previous synthesis were added to the reaction mixture. The solid products were recovered after 7 days of reaction.

The product was identified by powder XRD and SEM to be pure a SSZ-35 molecular sieve.

Example 3

Synthesis of SSZ-35

1.92 g of deionized water, 3.32 g of a 10.19% 3,3'-(butane-1,4-diyl)bis(1-methyl-2-propyl-1H-imidazol-3-ium) hydroxide solution, 0.03 g of boric acid powder, 2.00 g of LUDOX© AS-30 colloidal silica (30 wt. % suspension in water) were mixed together in a Teflon liner. The resulting gel was stirred until it became homogeneous. The liner was then capped and sealed within a Parr steel autoclave reactor. The autoclave was then put in an oven and heated at 160° C. for 11 days with tumbling (43 rpm). The solid products were recovered from the cooled reactor by centrifugation, washed with deionized water and dried at 95° C.

Figure 3:
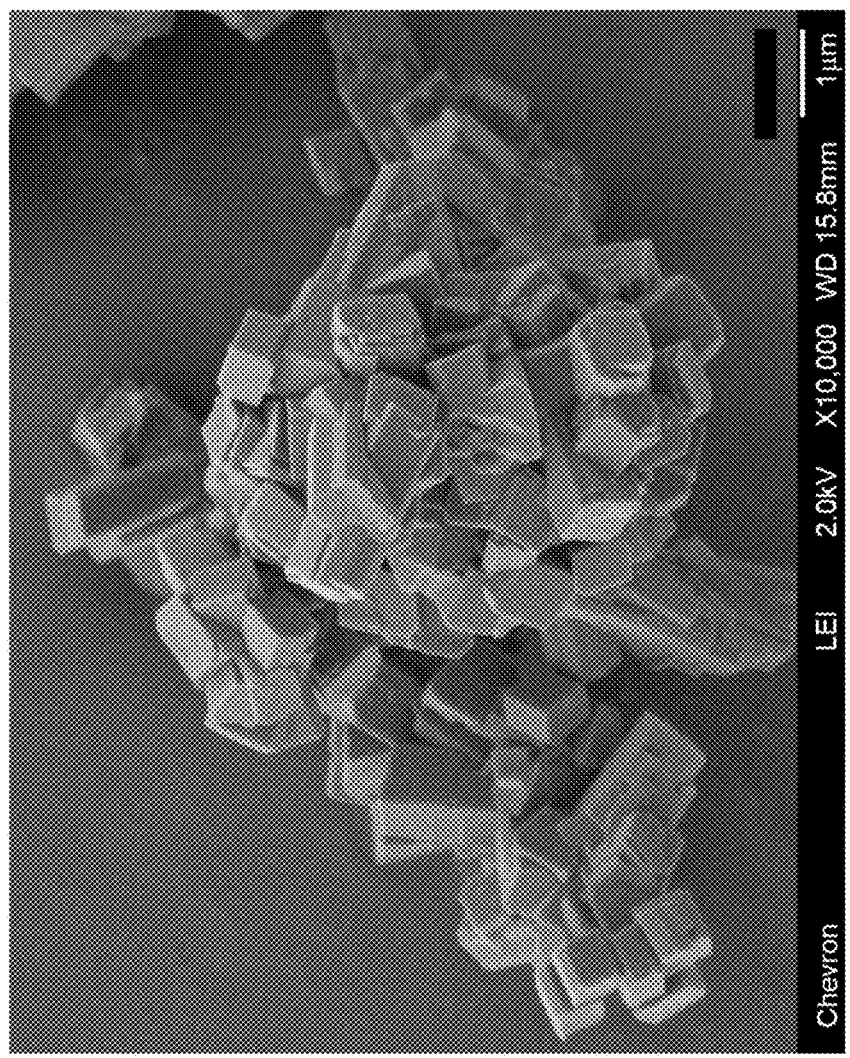
FIG. 3 shows a SEM image of the as-synthesized molecular sieve prepared in Example 3.
Figure 4:
FIG. 4 shows a powder XRD pattern of the calcined molecular sieve prepared in Example 5.

The resulting product was analyzed by powder XRD and SEM and shown to be SSZ-35. A SEM image of the product is shown in FIG. 3 and indicates a uniform field of crystals.

The product had a $SiO_2/B_2O_3$ molar ratio of 40.6, as determined by ICP elemental analysis.

Example 4

Seeded Synthesis of SSZ-35

Example 3 was repeated with the exception that 10 wt. % seed crystals of borosilicate SSZ-35 from a previous synthesis were added to the reaction mixture. The solid products were recovered after 7 days of reaction.

The product was identified by powder XRD and SEM to be a pure SSZ-35 molecular sieve.

Example 5

Calcination of SSZ-35

The as-synthesized molecular sieve of Example 1 was calcined inside a muffle furnace under a flow of a mixture of nitrogen and air heated to 540° C. at a rate of 1° C./minute and held at 540° C. for 5 hours, cooled and analyzed by powder XRD.

The powder XRD pattern of the calcined molecular sieve is shown in FIG. 3 and indicates that the material remains stable after calcination to remove the organic matter.

Example 6

Micropore Volume Analysis

The calcined material of Example 5 had a micropore volume of 0.20 cm$^3$/g based on argon adsorption isotherm at 87.50 K (−186° C.) recorded on ASAP 2010 equipment from Micromeritics. The sample is first degassed at 400° C. for 16 hours prior to argon adsorption. The low-pressure dose is 2.00 cm$^3$/g (STP). A maximum of one hour equilibration time per dose is used and the total run time is 37 hours. The argon adsorption isotherm is analyzed using the density function theory (DFT) formalism and parameters developed for activated carbon slits by J. P. Olivier (*J. Porous Mater.* 1995, 2, 9-17) using the Saito Foley adaptation of the Horvarth-Kawazoe formalism (*Micropor. Mater.* 1995, 3, 531-542) and the conventional t-plot method (*J. Catal.* 1965, 4, 319-323).

The invention claimed is:

1. A method of synthesizing a molecular sieve having the structure of SSZ-35, the method comprising:
   (a) providing a reaction mixture comprising:
      (1) a source of silicon oxide;
      (2) a source of boron oxide;
      (3) optionally, a source of a Group 1 or Group 2 metal (M);
      (4) a structure directing agent (Q) comprising 3,3'-(butane-1,4-diyl)bis(1-methyl-2-propyl-1H-imidazol-3-ium) dications;
      (5) a source of hydroxide ions; and
      (6) water; and
   (b) subjecting the reaction mixture to crystallization conditions sufficient to form crystals of the molecular sieve.

2. The method of claim 1, wherein the reaction mixture has a composition, in terms of molar ratios, as follows:

| | |
|---|---|
| $SiO_2/B_2O_3$ | ≥2 |
| $M/SiO_2$ | 0 to 0.5 |
| $Q/SiO_2$ | 0.05 to 0.50 |
| $OH/SiO_2$ | 0.15 to 0.50 |
| $H_2O/SiO_2$ | 10 to 80. |

3. The method of claim 1, wherein the reaction mixture has a composition, in terms of molar ratios, as follows:

| | |
|---|---|
| $SiO_2/B_2O_3$ | 10 to 50 |
| $M/SiO_2$ | 0 to 0.10 |
| $Q/SiO_2$ | 0.10 to 0.30 |
| $OH/SiO_2$ | 0.15 to 0.40 |
| $H_2O/SiO_2$ | 15 to 50. |

4. The method of claim 1, wherein the source of boron oxide comprises one or more of boric acid, sodium tetraborate, and potassium tetraborate.

5. The method of claim 1, wherein the reaction mixture also contains seeds.

6. The method of claim 5, wherein the reaction mixture comprises from 0.01 to 15,000 ppm by weight of seeds.

7. The method of claim 5, wherein the seeds comprise a crystalline material having the structure of SSZ-35.

8. The method of claim 1, wherein the crystallization conditions include a temperature of from 125° C. to 200° C.

9. A molecular sieve having the structure of SSZ-35 and, in its as-synthesized form, comprising 3,3'-(butane-1,4-diyl)bis(1-methyl-2-propyl-1H-imidazol-3-ium) dications in its pores.

10. The molecular sieve of claim 9, and having a $SiO_2/B_2O_3$ molar ratio of 10 to 50.

* * * * *